United States Patent
Kareis

(10) Patent No.: US 10,160,676 B2
(45) Date of Patent: Dec. 25, 2018

(54) DECHLORINATION COMPOSITIONS, COMPRESSED SOLIDS FORMED THEREFROM, AND METHODS OF PREPARING THE SAME

(71) Applicant: Axiall Ohio Inc., Atlanta, GA (US)

(72) Inventor: Christopher M. Kareis, Monroeville, PA (US)

(73) Assignee: EAGLE US 2 LLC, Houston, TX (US)

( * ) Notice: Subject to any disclaimer, the term of this patent is extended or adjusted under 35 U.S.C. 154(b) by 12 days.

(21) Appl. No.: 15/217,215

(22) Filed: Jul. 22, 2016

(65) Prior Publication Data

US 2017/0022076 A1 Jan. 26, 2017

Related U.S. Application Data

(60) Provisional application No. 62/196,347, filed on Jul. 24, 2015.

(51) Int. Cl.
*C02F 1/68* (2006.01)
*C02F 1/70* (2006.01)
*C02F 101/12* (2006.01)

(52) U.S. Cl.
CPC ............ *C02F 1/68* (2013.01); *C02F 1/70* (2013.01); *C02F 2101/12* (2013.01); *C02F 2303/185* (2013.01)

(58) Field of Classification Search
CPC ...................................... C02F 1/68; C02F 1/70
See application file for complete search history.

(56) References Cited

U.S. PATENT DOCUMENTS

| | | | |
|---|---|---|---|
| 3,260,674 A | 7/1966 | Ross | |
| 4,816,177 A | 3/1989 | Nelson et al. | |
| 5,192,571 A | 3/1993 | Levy | |
| 6,221,257 B1 | 4/2001 | Grim | |
| 6,402,984 B1 | 6/2002 | Nakajima et al. | |
| 6,472,198 B1 | 10/2002 | Semprini et al. | |
| 6,689,326 B1 | 2/2004 | Jackson | |
| 7,682,513 B2 | 3/2010 | Wang | |
| 8,147,673 B2 | 4/2012 | Childers, II et al. | |
| 8,449,778 B2 | 5/2013 | Gong et al. | |
| 2005/0139805 A1 | 6/2005 | Koster | |
| 2006/0065606 A1 | 3/2006 | McGuire | |
| 2006/0102874 A1 | 5/2006 | Zheng | |
| 2008/0017584 A1 | 1/2008 | Reimann-Philipp | |
| 2008/0073291 A1 | 3/2008 | Ritter | |
| 2010/0072144 A1 | 3/2010 | Osakabe et al. | |
| 2010/0084336 A1 | 4/2010 | Lee et al. | |
| 2010/0147776 A1 | 6/2010 | Hojjatie et al. | |
| 2012/0108426 A1 | 5/2012 | Gong et al. | |
| 2012/0138516 A1 | 6/2012 | Childers, II et al. | |
| 2013/0020265 A1 | 1/2013 | Kamatsuchi et al. | |
| 2014/0102978 A1 | 4/2014 | Smith et al. | |
| 2014/0308371 A1 | 10/2014 | Parasida et al. | |
| 2014/0332474 A1 | 11/2014 | Fouchet | |

FOREIGN PATENT DOCUMENTS

| | | | |
|---|---|---|---|
| CA | 1230825 A | * | 12/1987 |
| JP | 2002346575 A | | 12/2002 |
| WO | 0126622 A1 | | 4/2001 |

OTHER PUBLICATIONS

Fan et al.; "A Bulk Boron-Based Photocatalyst for Efficient Dechlorination: $K_3B_6O_{10}Br$"; Chemistry of Materials; 2014; pp. 3169-3174; vol. 26:10.

Helz et al.; "Dechlorination of wastewater and cooling water"; Environmental Science & Technology; 1984; pp. 48A-55A; vol. 18:2.

* cited by examiner

*Primary Examiner* — Peter F Godenschwager
(74) *Attorney, Agent, or Firm* — The Webb Law Firm

(57) ABSTRACT

A dechlorination composition for dechlorinating water includes at least one alkali metal sulfite, at least one borate, at least one hydrogenated vegetable oil, and at least one saccharide. The dechlorination composition can also include at least one colorant, at least one stearate salt, and at least one halide salt. The dechlorination composition can be formed into a compressed solid. Methods of preparing compressed solids of dechlorination compositions are also disclosed.

23 Claims, 2 Drawing Sheets

DECHLORINATION COMPOSITIONS, COMPRESSED SOLIDS FORMED THEREFROM, AND METHODS OF PREPARING THE SAME

CROSS REFERENCE TO RELATED APPLICATIONS

This application claims the benefit of U.S. Provisional Patent Application No. 62/196,347, filed Jul. 24, 2015, which is incorporated herein by reference in its entirety.

BACKGROUND OF THE INVENTION

Field of the Invention

The present invention relates to dechlorination compositions, compressed solids prepared from such compositions, and methods of forming compressed solids.

Description of Related Art

Chlorine, in a formal +1 oxidation state (e.g. hypochlorous acid or hypochlorite anion) and simply called chlorine herein, is the most commonly used disinfectant in water and wastewater treatment processes. While chlorination is an effective, versatile, and cost-effective means of limiting the spread of waterborne illness, moderate chlorine concentrations can also kill various aquatic life-forms. Because of this adverse effect, governmental agencies have established regulations that limit the amount of chlorine that can be present in treated water discharged into the environment, such as into lakes or rivers.

To comply with governmental regulations, a dechlorination step is implemented to neutralize the residual chlorine. One method of dechlorinating treated water includes adding a dechlorination composition that neutralizes the residual chlorine. For small and moderate scale operations, dechlorination compositions are commonly formed into tablets or pellets so that the dechlorination compositions slowly dissolve and interact with the residual chlorine dispersed throughout the treated water. Currently available dechlorination compositions generally require considerable processing (such as heating), which can have an adverse impact on manufacturing throughput and costs. For instance, some procedures blend sodium sulfite powder with calcium caseinate and water. The mixture is then either pressed into tablets and subsequently air-dried; or the moist mixture is granulated, dried, regranulated, and finally formed into tablets. Other current processes blend various ingredients with a liquid binder, press the mixture to form a tablet, and dry the formed tablet at elevated temperatures for over an hour. Other dechlorination compositions exist, but they involve similarly costly processing steps, such as baking. As such, there is a need for a new dechlorination composition that can be formed into solid objects, such as tablets, without the need for cumbersome processing steps.

SUMMARY OF THE INVENTION

In some examples, a dechlorination composition is provided that comprises at least one alkali metal sulfite, at least one borate, at least one hydrogenated vegetable oil, and at least one saccharide. In certain examples, the alkali metal sulfite comprises sodium sulfite. The alkali metal sulfite can also comprise at least 60 weight % of the total weight of the dechlorination composition, and can have an average particle size of 50 to 350 microns.

Further, in some examples, the saccharide comprises a monosaccharide and/or a polysaccharide having a stoichiometry of water molecules of greater than 0, and can comprise from 0.1 to 30 weight % of the total weight of the dechlorination composition. In addition, the borate can comprise boric acid, metaboric acid, boric anhydride, an alkali metal borate, or combinations thereof, and can comprise from 0.1 to 30 weight % of the total weight of the dechlorination composition. The hydrogenated vegetable oil can comprise from 0.1 to 30 weight % of the total weight of the dechlorination composition.

In some examples, the dechlorination composition can comprise one or more additional components. For example, the dechlorination compositions can also comprise at least one colorant, and/or at least one stearate salt, and/or at least one halide salt. The halide salt can comprise an alkali and/or alkaline earth metal halide salt, and can comprise up to 20 weight % of the total weight of the dechlorination composition. The stearate salt can comprise an inorganic stearate salt, and can comprise up to 10 weight % of the total weight of the dechlorination composition. Further, the colorant can comprise up to 1 weight % of the total weight of the dechlorination composition.

In some examples, the saccharide can be included at a particular amount relative to the borate. For example, the weight ratio of the saccharide to the borate can be selected within a range of from 1.8:0.2 to 0.2:1.8.

In certain examples, the components that are used to form the dechlorination compositions can be combined at various amounts and compressed to form a compressed solid including, but not limited to, a tablet, pellet, or granule.

In one non-limiting example, the dechlorination composition is a compressed solid and comprises: at least one alkali metal sulfite comprising at least 60 weight % of the total weight of the dechlorination composition; at least one borate comprising from 0.1 to 30 weight % of the total weight of the dechlorination composition; at least one hydrogenated vegetable oil comprising from 0.1 to 30 weight % of the total weight of the dechlorination composition; and at least one saccharide comprising from 0.1 to 30 weight % of the total weight of the dechlorination composition. Further, the compressed solid can also include a colorant comprising up to 1 weight % of the total weight of the dechlorination composition.

In some examples, a method of preparing a dechlorination compressed solid is provided by a method comprising: mixing at least one alkali metal sulfite, at least one borate, at least one hydrogenated vegetable oil, and at least one saccharide to form a dry blended composition; forming a compressed solid from the dry blended composition; and exposing the compressed solid to ambient conditions or a temperature above ambient conditions for a predetermined or set period of time. Any of the other additional components can also be mixed into the dry blended composition before compressing. In addition, the alkali metal sulfite can be milled to an average particle size of 50 microns to 350 microns prior to mixing it into the dry blended composition.

DESCRIPTION OF THE INVENTION

Figure 1:
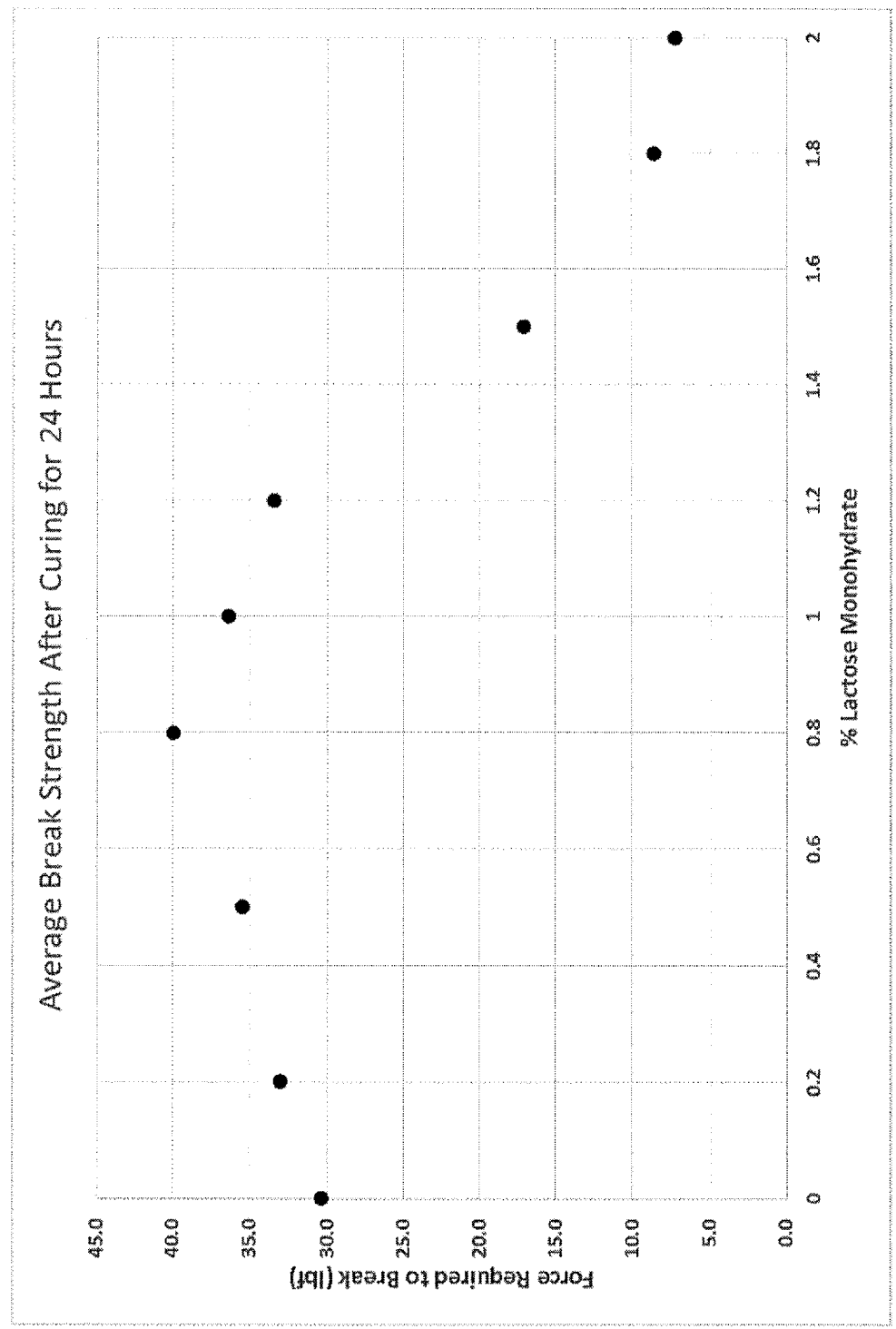
FIG. 1 is a graph of the average hardness values of pellets having different amounts of lactose monohydrate and which were measured after 24 hours from formation of the pellets.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, the present invention is directed to a dechlorination composition. As used herein, "dechlorination" refers to the process of removing residual chlorine from water, such as disinfected water. A "dechlorination composition" refers to a composition of chemical components in which at least some of the components are capable of reacting with residual chlorine to remove the chlorine from water, such as disinfected water. The term "residual chlorine" refers to both free available chlorine (e.g. hypochlorous acid and hypochlorite) and combined chlorine (e.g. various chloramines, such as monochloramine). Further, as used herein, "removal of chlorine from water" refers to the reduction of the oxidative state of free and combined chlorine such that the chlorine cannot be used as an oxidant.

Further, the dechlorination composition can be used in various forms such as a compressed solid or non-compacted particles, for example. As used herein, a "compressed solid" refers to a mixture of dry components that are compacted and held together. Non-limiting examples of a compressed solid include a tablet, pellet, granule, or combinations thereof.

In some examples, the components used to prepare the dechlorination composition can comprise at least one alkali metal sulfite, such as for example sodium sulfite, potassium sulfite, rubidium sulfite, caesium sulfite, francium sulfite, or combinations thereof. The alkali metal sulfites can be used alone or together as the active ingredient in the dechlorination composition. As the active ingredient, the alkali metal sulfite reduces residual chlorine found in disinfected water.

The alkali metal sulfite can also be milled, such as with a QUADRO® COMIL® Model 196 milling device, to a desired particle size before mixing the alkali metal sulfite with additional components to form the dechlorination composition. For example, the alkali metal sulfite can be ground to an average particle size ranging from 50 microns to 350 microns, from 100 microns to 300 microns, or from 150 microns to 250 microns. As used herein, "average particle size" refers to the size of 50 weight % or more of the particles in a sample. The average particle size can be determined using a sieve analysis test as known to those skilled in the art. The sieve analysis test for determining particle size is described by ASTM C136/C136M-14, which is incorporated by reference herein.

The alkali metal sulfite can comprise at least 60 weight %, 70 weight %, 80 weight %, at least 85 weight %, or at least 90 weight % of the dechlorination composition, based on the total weight of the composition. The alkali metal sulfite can comprise up to 98 weight %, up to 95 weight %, or up to 90 weight % of the dechlorination composition, based on the total weight of the composition. The alkali metal sulfite can also be added to the dechlorination composition within a range such as from 80 to 98 weight %, or from 85 to 95 weight %, based on the total weight of the composition. It is appreciated that the amount of alkali metal sulfite in the dechlorination composition can be selected within a range of any of the end values previously described.

The dechlorination composition can also comprise at least one borate. Without being bound by theory, it is believed that the borate forms at least a portion of the binder and helps control the dissolution rate and/or provide a desired hardness when the compositions are formed into a compressed solid. As used herein, the "dissolution rate" refers to the time it takes for a portion of the compressed solid to dissolve in a solvent over a certain period of time, and the term "hardness" refers to the ability of a compressed solid to withstand a particular force without breaking in half across the diameter. Further, as used herein, a "borate" refers to boron-containing oxyanions or compounds containing them. Suitable borates that can be used with the dechlorination compositions described herein include, but are not limited to, boric acid, metaboric acid, boric anhydride, alkali metal borates, or combinations thereof. Non-limiting examples of alkali metal borates include sodium borate, lithium borate, potassium borate, hydrated alkali metal borates, or combinations thereof. Another non-limiting example of a borate is calcium metaborate.

The borate can comprise at least 0.1 weight %, at least 0.5 weight %, at least 0.8 weight %, at least 1 weight %, or at least 1.2 weight % of the dechlorination composition, based on the total weight of the composition. The borate can comprise up to 30 weight %, up to 20 weight %, up to 10 weight %, up to 6 weight %, up to 4 weight %, or up to 2 weight % of the dechlorination composition, based on the total weight of the composition. The borate can also be added to the dechlorination composition within a range such as, for example, from 0.1 to 30 weight %, from 0.1 to 20 weight %, from 0.5 to 10 weight %, from 0.8 to 2 weight %, or from 0.8 weight % to 1.2 weight %, based on the total weight of the composition. It is appreciated that the amount of borate in the dechlorination composition can be selected within a range of any of the end values previously described.

The dechlorination composition can also include one or more hydrogenated vegetable oils that forms at least a portion of the binder and which can help control the dissolution rate and/or provide a desired hardness when the compositions are formed into a compressed solid. The hydrogenated vegetable oil may be partially or fully hydrogenated. A "partially hydrogenated vegetable oil" refers to a vegetable oil that has been treated with hydrogen or a source of hydrogen to convert only a portion of the carbon-carbon double bonds into carbon-carbon single (saturated) bonds. In contrast, a "fully hydrogenated vegetable oil" refers to a vegetable oil that has been treated with hydrogen or a source of hydrogen to convert all of the carbon-carbon double bonds into carbon-carbon single (saturated) bonds.

Examples of hydrogenated vegetable oils include, but are not limited to, hydrogenated cottonseed oil, soybean oil, corn oil, peanut oil, palm oil, sunflower seed oil, or combinations thereof. A non-limiting example of a commercially available hydrogenated cottonseed oil includes LUBRI-TAB® from JRS PHARMA LP, USA. Other non-limiting examples of commercially available hydrogenated vegetable oils include those available from ABITEC under the trade name STEROTEX® such as: STEROTEX® K, NF; STEROTEX® HM, NF; and STEROTEX® NF.

In some examples, the hydrogenated vegetable oil used with the dechlorination composition can also have an average particle of 850 microns to 425 microns, or from 710 microns to 500 microns, or from 650 microns to 550 microns. These particle sizes can be formed by grinding, milling, mixing, or otherwise breaking up the hydrogenated vegetable oil such that the particles can pass through a 20 to 40 mesh sieve, a 25 to 35 mesh sieve, or a 30 mesh sieve.

The dechlorination composition can comprise from 0.1 to 30 weight %, from 0.1 to 20 weight %, from 0.1 to 10 weight %, from 1 to 8 weight %, or from 2 to 7 weight % of the hydrogenated vegetable oil, based on the total weight of the composition. It is appreciated that the amount of hydrogenated vegetable oil in the dechlorination composition can be selected within a range of any of the end values previously described.

The dechlorination composition can also comprise one or more other components. For example, the dechlorination composition can also comprise one or more other components that form at least a portion of the binder of the dechlorination composition. Non-limiting examples of other components that can be used with the dechlorination composition comprise one or more saccharides. The saccharides used with the dechlorination compositions can include monosaccharides and/or polysaccharides. As used herein, a "polysaccharide" refers to a molecule with two or more monosaccharide units linked together, such as a disaccharide, for example. Suitable saccharides that can be used with the dechlorination composition include, but are not limited to, glucose, dextrose, fructose, lactose, sucrose, maltose, and combinations thereof. The saccharide can also have a hydration stoichiometry of 0 to 5 water molecules per unit formula of saccharide. As used herein, "hydration stoichiometry of water molecules" refers to the amount of water molecules associated with a compound. A stoichiometry of zero ("0") water molecules refers to an anhydrous compound that is not associated with any water molecules, while a stoichiometry of water molecules of greater than 0 refers to a compound having water molecules associated therewith. A non-limiting example of a hydrated saccharide is lactose monohydrate, which is a saccharide with a hydration stoichiometry of 1 water molecule per unit formula of lactose.

The saccharides can comprise at least 0.05 weight %, at least 0.1 weight %, at least 0.5 weight %, at least 0.8 weight %, at least 1 weight %, or at least 1.2 weight % of the dechlorination composition, based on the total weight of the composition. The saccharide can comprise up to 30 weight %, up to 20 weight %, up to 10 weight %, up to 7 weight %, up to 5 weight %, up to 2 weight %, or up to 1.2 weight % of the dechlorination composition, based on the total weight of the composition. The saccharide can also be added to the dechlorination composition within a range such as, for example, from 0.1 to 30 weight %, from 0.1 to 20 weight %, from 0.1 to 10 weight %, from 0.1 to 7 weight %, from 0.5 to 5 weight %, from 0.8 to 2 weight %, from 0.05 to 1.2 weight %, or from 0.8 weight % to 1.2 weight %, based on the total weight of the composition. It is appreciated that the amount of saccharide in the dechlorination composition can be selected within a range of any of the end values previously described.

In some examples, the saccharide can be included at a particular amount relative to the borate. For example, the saccharide and the borate can be present in the dechlorination compositions at a weight ratio of saccharide to borate of 1.8:0.2 to 0.2:1.8 or at a weight ratio of saccharide to borate of 1.2:0.8 to 0.2:1.8 or at a weight ratio of saccharide to borate of 1.2:0.8 to 0.8:1.2, based on the total weight of the composition.

Another non-limiting example of a component that can form at least a portion of the binder of the dechlorination composition includes a halide salt. The term "halide" refers to an anion of a halogen, and a "halide salt" refers to a salt having one or more anions of a halogen and at least one other atom that is not a halogen. The halide salts can include, but are not limited to, inorganic halide salts. An "inorganic halide salt" means a salt of an inorganic cation and which includes one or more halogen anions. Such inorganic halide salts can be selected from alkali and/or alkaline earth metal halide salts.

Non-limiting examples of suitable halide salts that can be used to prepare the dechlorination compositions described herein include sodium chloride, lithium chloride, potassium chloride, magnesium chloride, calcium chloride, sodium fluoride, lithium fluoride, potassium fluoride, magnesium fluoride, calcium fluoride, or combinations thereof.

The dechlorination composition can comprise up to 20 weight %, up to 10 weight %, up to 5 weight %, up to 4 weight %, or up to 3 weight % of a halide salt, based on the total weight of the composition. The dechlorination compositions can also comprise from 0.1 to 20 weight %, from 0.1 to 10 weight %, from 0.1 to 5 weight %, from 0.5 to 4 weight %, or from 1 to 3 weight % of a halide salt, based on the total weight of the composition. It is appreciated that the amount of halide salt in the dechlorination composition can be selected within a range of any of the end values previously described.

Other non-limiting examples of components that can be used to prepare the dechlorination composition comprise stearate salts. The term "stearate" refers to the salts and esters of stearic acid. A "stearate salt" refers to a salt having one or more stearate anions ($C_{17}H_{35}COO^-$) and at least one other atom that is not a stearate. The stearate salts can include, but are not limited to, inorganic stearate salts. An "inorganic stearate salt" means a salt of an inorganic cation and which includes one or more stearate anions. Specific non-limiting examples of stearate salts include, aluminum stearates, calcium stearates, magnesium stearates, and combinations thereof.

The stearate salts can be added to the dechlorination composition in an amount sufficient to provide a desired dissolution rate or to provide a desired hardness when the compositions are formed in a compressed solid. For instance, the dechlorination composition can comprise up to 10 weight %, up to 8 weight %, up to 5 weight %, up to 1 weight %, up to 0.5 weight %, up to 0.4 weight %, or up to 0.3 weight % of a stearate salt, based on the total weight of the composition. The dechlorination compositions can also comprise from 0.05 to 10 weight %, from 0.05 to 8 weight %, from 0.05 to 5 weight %, from 0.05 to 1 weight %, from 0.05 to 0.5 weight %, from 0.1 to 0.5 weight %, or from 0.1 to 0.4 weight % of a stearate salt, based on the total weight of the composition. It is appreciated that the amount of stearate salt in the dechlorination composition can be selected within a range of any of the end values previously described.

The dechlorination composition can further comprise at least one colorant. As used herein, a "colorant" refers to any material that changes the color or appearance of the dechlorination composition. The colorant can include an environmentally acceptable food colorant such as a food grade colorant. A "food grade colorant" is a colorant that is suitable for use in products that are directly, or indirectly, intended for human or animal consumption including, but not limited to, water. A non-limiting example of a suitable commercially available food grade colorant includes Green Lake Blend, which is a blend of tartrazine aluminum lake and brilliant blue FCF aluminum lake commercially available from Sensient Colors LLC.

The colorant can be added to the dechlorination composition in an amount sufficient to provide a desired visual appearance. To provide a particular visual appearance, the dechlorination composition can comprise up to 1 weight %, up to 0.5 weight %, or up to 0.1 weight % of a colorant, based on the total weight of the composition. The dechlorination compositions can also comprise from 0.01 to 1 weight %, or from 0.05 to 0.5 weight % of a colorant, based on the total weight of the composition. It is appreciated that the amount of colorant in the dechlorination composition can be selected within a range of any of the end values previously described.

As indicated, various combinations and amounts of the previously described components can be combined to form a compressed solid that when added to disinfected water reduces residual chlorine. The compressed solid of the present invention can be formed by first mixing the components of the dechlorination composition to form a dry blended composition, such as using a ribbon blender or similar device. As used herein, a "dry blended composition" refers to a homogenous mixture of dry materials. Further, and as previously described, the alkali metal sulfite can be milled to obtain a particular particle size prior to mixing.

After mixing, the dry blended composition can be compacted together to form a compressed solid. The dry blended composition can be compacted together using techniques known in the art including, but not limited to, direct compression such as with a tablet press. The compressed solid can include, but is not limited to, a tablet, pellet, granule, or combinations thereof.

Next, the compressed solid can be exposed to ambient conditions for a set period of time. For example, the compressed solid can be exposed to ambient conditions for at least 1 day, at least 5 days, at least 7 days, at least 10 days, or at least 14 days. As used herein, "ambient conditions" refers to the temperature and pressure of the surrounding environment. The ambient conditions at which the compressed solid is exposed can include, but is not limited to, a temperature of −20° C. to 50° C. and a pressure of 0.5 atmospheres (atm) to 3 atm, or about 25° C. and 1 atm. Alternatively, heat can be applied to hasten the curing of the compressed solids. As used herein, "heating of the compressed solids" refers to a step of applying external heat to raise the temperature above ambient conditions, such as a temperature within a range of greater than 50° C. and up to 70° C. for example.

It was found that exposure to ambient conditions or heat helps form a compressed solid with a hardness that allows normal shipping and handling without excessive fragmentation of the compressed solids, as well as desired dissolution rates to effectively remove residual chlorine from disinfected water. For instance, well-defined pellets having a mass of 30.5±0.5 g, a thickness of 0.360±0.01 inches, a diameter of 1.77 inches, and a nominal density of 2.05±0.1 g/cm$^3$ can have a hardness (i.e., the ability of a compressed solid to withstand a particular force without breaking in half across the diameter) to withstand a breaking force of greater than 20 lbf (pounds-force), or greater than 30 lbf, or 40 lbf or greater. The hardness is determined by applying different amounts of force from a Mecmesin force stand until the compressed solid breaks in half across the diameter.

In addition, tablets formed from the same formulation with an average height of 22 mm or 2.2 cm, an average diameter of 2⅝ inches, an average weight of 160 grams, and an average density of 2 g/cm$^3$ can have a hardness of greater than 100 lbf and a dissolution rate of 10 to 50 grams per hour at 68° F. when added to a single tube feeder with a flow rate of 3 gallons per minute of water. The hardness is determined with a Mecmesin force stand as previously explained. The dissolution rate is determined by weighing the tablet before adding it to a single tube feeder, placing the tablet in the single tube feeder, applying water with a flow rate of 3 gallons per minute at 68° F., removing the tablet after a predetermined amount of time, re-weighing the tablet, and then calculating the dissolution rate of the tablet based on the difference in weight per time period water was applied in the single tube feeder.

The following examples are presented to demonstrate the general principles of the invention. The invention should not be considered as limited to the specific examples presented. All parts and percentages in the examples are by weight unless otherwise indicated.

Examples 1-9

Preparation of Dechlorination Compositions

Nine (9) dechlorination compositions were prepared from the components listed in Table 1.

TABLE 1

| Component | Ex. 1 (%) | Ex. 2 (%) | Ex. 3 (%) | Ex. 4 (%) | Ex. 5 (%) | Ex. 6 (%) | Ex. 7 (%) | Ex. 8 (%) | Ex. 9 (%) |
|---|---|---|---|---|---|---|---|---|---|
| Sodium Sulfite [1] | 93 | 93 | 93 | 93 | 93 | 93 | 93 | 93 | 93 |
| LUBRITAB ® [2] | 5 | 5 | 5 | 5 | 5 | 5 | 5 | 5 | 5 |
| Lactose Monohydrate | 2 | 1.8 | 1.5 | 1.2 | 1 | 0.8 | 0.5 | 0.2 | 0 |
| Boric Acid | 0 | 0.2 | 0.5 | 0.8 | 1 | 1.2 | 1.5 | 1.8 | 2 |

[1] Sodium sulfite having an average particle size of 50 to 350 microns.
[2] Hydrogenated cottonseed oil, commercially available from JRS Pharma.

For each of Examples 1-9, the hydrogenated cottonseed oil (LUBRITAB®) was broken up with a QUADRO® COMM® Model 196 to form particles that could pass through a 30 mesh sieve. The hydrogenated cottonseed oil (LUBRITAB®), lactose monohydrate, and boric acid were combined and then tumble blended for a period of five minutes using a ribbon blender. The sodium sulfite was added to the mixture of hydrogenated cottonseed oil (LUBRITAB®), lactose monohydrate, and boric acid. All the components were then blended for an additional 5 minutes to form homogenous powdered compositions.

Example 10

Formation of Dechlorination Pellets

The homogenous dechlorination compositions prepared in Examples 1-9 were massed into a single punch stainless steel die set. After adding the homogenous dechlorination compositions to the die set, approximately 30 tons of pressure for one second or less was applied to the powdered compositions to form well-defined pellets having a mass of 30.5±0.5 g, a thickness of 0.360±0.01 inches, a diameter of 1.77 inches, and a nominal density of 2.05±0.1 g/cm³. Five pellets formed from each of the compositions of Examples 1-9 were allowed to sit, undisturbed, for 24 hours in ambient conditions prior to testing. In addition, a second set of five pellets formed from each of the compositions of Examples 1-9 were allowed to sit, undisturbed, for 168 hours in ambient conditions prior to testing. The hardness of each pellet was then determined by applying different amounts of force from a Mecmesin force stand until the pellet broke in half across the diameter. The average hardness of each set of pellets formed from the compositions of Examples 1-9 are shown in Table 2.

TABLE 2

| Pellet | Average Hardness After 24 Hours[3] (lbf) | Average Hardness After 168 Hours[3] (lbf) |
| --- | --- | --- |
| Example 1 | 7.2 | 7.2 |
| Example 2 | 8.6 | 10.8 |
| Example 3 | 17.1 | 21.5 |
| Example 4 | 33.4 | 43.1 |
| Example 5 | 36.3 | 42.8 |
| Example 6 | 39.9 | 46.6 |
| Example 7 | 35.4 | 39.6 |
| Example 8 | 33.0 | 43.0 |
| Example 9 | 30.4 | 38.7 |

As shown in Table 2, pellets prepared with the dechlorination compositions of Example 6 exhibited higher hardness values than the pellets prepared with the dechlorination compositions of Examples 1-5 and 7-9. Thus, dechlorination compositions having about 0.8 weight % lactose monohydrate and about 1.2 weight % boric acid provided the hardest pellets.

[3]Highest force a pellet could withstand without breaking in half across the diameter.

Figure 2:
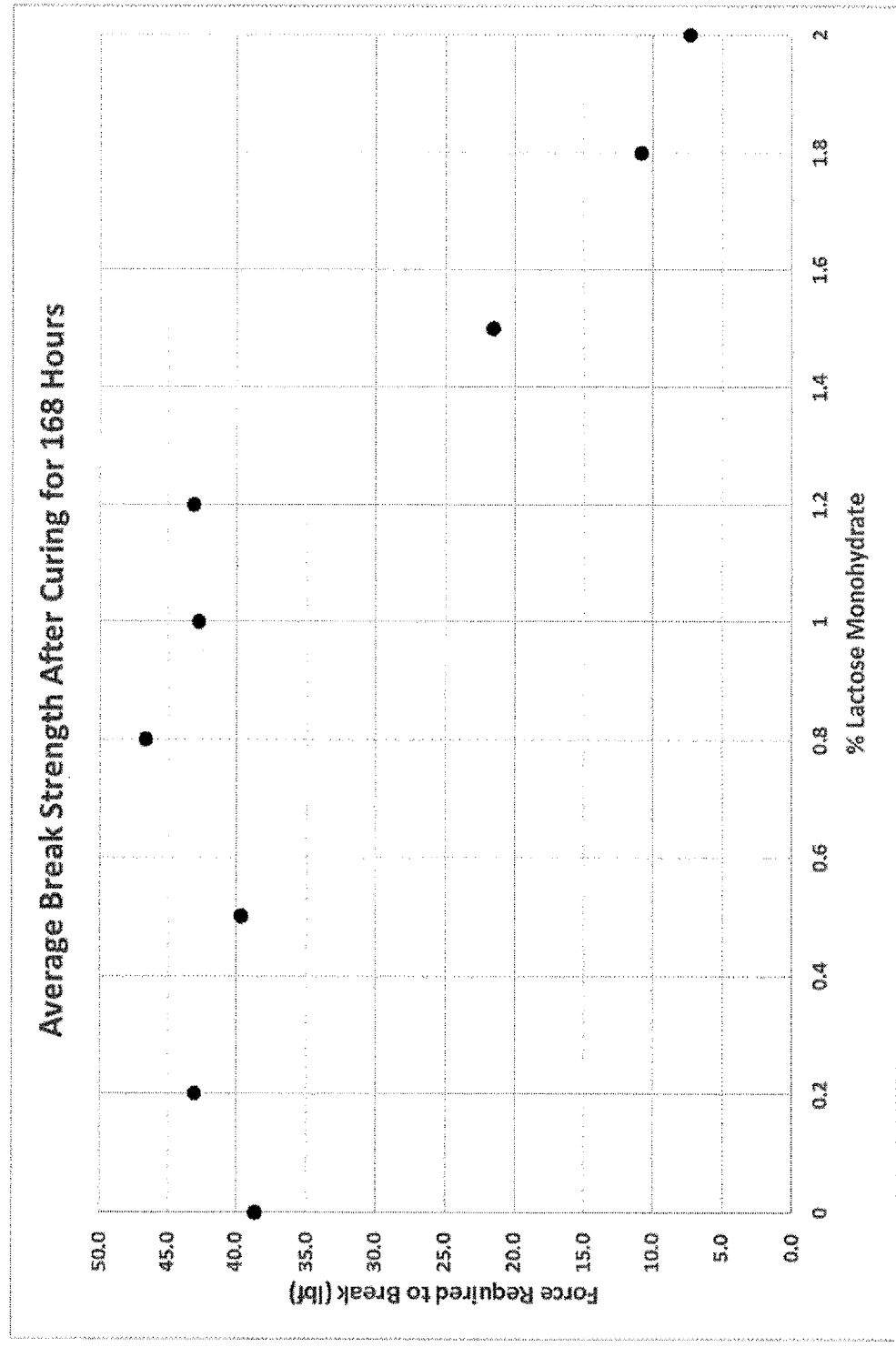
FIG. 2 is a graph of the average hardness values of pellets having different amounts of lactose monohydrate and which were measured after 168 hours from formation of the pellets.

As further shown in Table 2, a significant decrease in hardness occurs when lactose monohydrate is increased to greater than 1.2 weight % of the total weight of the composition. FIGS. 1 and 2, which are graphs of the average hardness values obtained from the pellets of Examples 1-9, show the significant drop in hardness when lactose monohydrate is increased to greater than 1.2 weight %.

Moreover, Table 2 also shows that the average hardness after 168 hours is greater than the average hardness after 24 hours. As such, additional exposure to ambient conditions increases the hardness of the pellets.

Examples 11-13

Preparation and Evaluation of Dechlorination Pellets

Three (3) dechlorination compositions according to the present invention were prepared from the components listed in Table 3.

TABLE 3

| Component | Example 11 (%) | Example 12 (%) | Example 13 (%) |
| --- | --- | --- | --- |
| Sodium Sulfite[1] | 93 | 93 | 93 |
| LUBRITAB ®[2] | 4.9 | 4.9 | 4 |
| Lactose Monohydrate | 1.2 | 1.2 | 1.2 |
| Boric Acid | 0.8 | 0.8 | 0.8 |
| Aluminum Stearate | 0.1 | 0 | 0 |
| Calcium Stearate | 0 | 0.1 | 0 |
| Sodium Chloride | 0 | 0 | 1 |

The dechlorination compositions of Examples 11 and 12 were prepared according to the procedure described in Examples 1-9, except that aluminum stearate and calcium strearate were added, respectively, to the initial blended mixture of hydrogenated cottonseed oil (LUBRITAB®), lactose monohydrate, and boric acid and blended for an additional five minutes. The dechlorination composition of Example 13 was also prepared according to the procedure described in Examples 1-9, except that sodium chloride was combined with the hydrogenated cottonseed oil (LUBRITAB®), lactose monohydrate, and boric acid before the initial mixing step. The dechlorination compositions of Examples 11-13 were then formed into pellets and tested for hardness according to the procedure described in Example 10. The average hardness of the pellets are shown in Table 4.

TABLE 4

| Pellet | Average Hardness After 24 Hours[3] (lbf) | Average Hardness After 168 Hours[3] (lbf) |
| --- | --- | --- |
| Example 11 | 22.8 | 32.9 |
| Example 12 | 23.9 | 31.9 |
| Example 13 | 34.1 | 42.1 |

As shown in Table 4, pellets prepared with dechlorination compositions comprising aluminum stearate, calcium stearate, or sodium chloride exhibited good hardness values. Table 4 also shows that the average hardness after 168 hours is greater than the average hardness after 24 hours.

Comparative Examples 14-15

Preparation and Evaluation of Dechlorination Pellets

Two (2) dechlorination compositions were prepared from the components listed in Table 5.

TABLE 5

| Component | Comparative Example 14 (%) | Comparative Example 15 (%) |
|---|---|---|
| Sodium Sulfite[1] | 93 | 93 |
| LUBRITAB ®[2] | 5 | 5 |
| Lactose Monohydrate | 1 | 0 |
| Boric Acid | 0 | 1 |
| Citric Acid | 1 | 0 |
| Corn Starch | 0 | 1 |

The dechlorination compositions of Comparative Examples 14-15 were prepared according to the procedure described in Examples 1-9, except that boric acid was replaced with citric acid in Comparative Example 14 and that lactose monohydrate was replaced with corn starch in Comparative Example 15. The dechlorination compositions of Comparative Examples 14-15 were then formed into pellets and tested for hardness according to the procedure described in Example 10. The average hardness of the pellets are shown in Table 6.

TABLE 6

| Pellet | Average Hardness After 24 Hours[3] (lbf) | Average Hardness After 168 Hours[3] (lbf) |
|---|---|---|
| Comparative Example 14 | 5.9 | 13.4 |
| Comparative Example 15 | 15.4 | 17.4 |

As shown in Table 6, pellets prepared with dechlorination compositions comprising citric acid instead of boric acid or corn starch instead of lactose monohydrate exhibited low hardness values.

The present invention is also directed to the following clauses.

Clause 1: A dechlorination composition comprising at least one alkali metal sulfite, at least one borate, at least one hydrogenated vegetable oil, and at least one saccharide.

Clause 2: The dechlorination composition of clause 1, further comprising at least one colorant.

Clause 3: The dechlorination composition of any of clauses 1-2, further comprising at least one halide salt.

Clause 4: The dechlorination composition of any of clauses 1-3, further comprising at least one stearate salt.

Clause 5: The dechlorination composition of any of clauses 1-4, wherein the borate comprises boric acid, metaboric acid, boric anhydride, an alkali metal borate, or combinations thereof.

Clause 6: The dechlorination composition of any of clauses 1-5, wherein the alkali metal sulfite comprises sodium sulfite.

Clause 7: The dechlorination composition of any of clauses 1-6, wherein the alkali metal sulfite comprises at least 60 weight % of the total weight of the dechlorination composition.

Clause 8: The dechlorination composition of any of clauses 1-7, wherein the borate comprises from 0.1 to 30 weight % of the total weight of the dechlorination composition.

Clause 9: The dechlorination composition of any of clauses 1-8, wherein the hydrogenated vegetable oil comprises from 0.1 to 30 weight % of the total weight of the dechlorination composition.

Clause 10: The dechlorination composition of any of clauses 1-9, wherein the saccharide comprises a monosaccharide and/or a polysaccharide having a stoichiometry of water molecules of greater than 0.

Clause 11: The dechlorination composition of any of clauses 1-10, wherein the saccharide comprises from 0.1 to 30 weight % of the total weight of the dechlorination composition.

Clause 12: The dechlorination composition of any of clauses 3-11, wherein the halide salt comprises an alkali and/or alkaline earth metal halide salt.

Clause 13: The dechlorination composition of any of clauses 3-12, wherein the halide salt comprises up to 20 weight % of the total weight of the dechlorination composition.

Clause 14: The dechlorination composition of any of clauses 2-13, wherein the colorant comprises up to 1 weight % of the total weight of the dechlorination composition.

Clause 15: The dechlorination composition of any of clauses 1-14, wherein the alkali metal sulfite comprises an average particle size of 50 to 350 microns.

Clause 16: The dechlorination composition of any of clauses 4-15, wherein the stearate salt comprises an inorganic stearate salt.

Clause 17: The dechlorination composition of any of clauses 4-16, wherein the stearate salt comprises up to 10 weight % of the total weight of the dechlorination composition.

Clause 18: The dechlorination composition of any of clauses 1-17, wherein the dechlorination composition is a compressed solid.

Clause 19: The dechlorination composition of any of clauses 1-18, wherein a weight ratio of the saccharide to the borate is within a range of from 1.8:0.2 to 0.2:1.8.

Clause 20: A dechlorination composition comprising: at least one alkali metal sulfite comprising at least 60 weight % of the total weight of the dechlorination composition; at least one borate comprising from 0.1 to 30 weight % of the total weight of the dechlorination composition; at least one hydrogenated vegetable oil comprising from 0.1 to 30 weight % of the total weight of the dechlorination composition; and at least one saccharide comprising from 0.1 to 30 weight % of the total weight of the dechlorination composition, wherein the dechlorination composition is a compressed solid.

Clause 21: The dechlorination composition of clause 20, further comprising at least one colorant comprising up to 1 weight % of the total weight of the dechlorination composition.

Clause 22: A method of preparing a dechlorination compressed solid comprising: a) mixing at least one alkali metal sulfite, at least one borate, at least one hydrogenated vegetable oil, and at least one saccharide to form a dry blended composition; b) forming a compressed solid from the dry blended composition; and c) exposing the compressed solid to ambient conditions or a temperature above ambient conditions for a set period of time.

Clause 23: The method of clause 22, further comprising milling the alkali metal sulfite to an average particle size of 50 microns to 350 microns prior to step a).

Whereas particular embodiments and examples of this invention have been described above for purposes of illustration, it will be evident to those skilled in the art that numerous variations of the details of the present invention may be made without departing from the invention as defined in the appended claims.

The invention claimed is:

1. A dechlorination composition comprising at least one alkali metal sulfite, at least one of boric acid, metaboric acid, boric anhydride, or combinations thereof, at least one hydrogenated vegetable oil, and at least one saccharide.

2. The dechlorination composition of claim 1, wherein the alkali metal sulfite comprises sodium sulfite.

3. The dechlorination composition of claim 1, wherein the alkali metal sulfite comprises an average particle size of 50 to 350 microns.

4. The dechlorination composition of claim 1, wherein the alkali metal sulfite comprises at least 60 weight % of the total weight of the dechlorination composition.

5. The dechlorination composition of claim 1, further comprising an alkali metal borate.

6. The dechlorination composition of claim 1, wherein the borate comprises from 0.1 to 30 weight % of the total weight of the dechlorination composition.

7. The dechlorination composition of claim 1, wherein the hydrogenated vegetable oil comprises from 0.1 to 30 weight % of the total weight of the dechlorination composition.

8. The dechlorination composition of claim 1, wherein the saccharide comprises a monosaccharide and/or a polysaccharide having a stoichiometry of water molecules of greater than 0.

9. The dechlorination composition of claim 1, wherein the saccharide comprises from 0.1 to 30 weight % of the total weight of the dechlorination composition.

10. The dechlorination composition of claim 1, further comprising a colorant.

11. The dechlorination composition of claim 10, wherein the colorant comprises up to 1 weight % of the total weight of the dechlorination composition.

12. The dechlorination composition of claim 1, further comprising a halide salt.

13. The dechlorination composition of claim 12, wherein the halide salt comprises an alkali and/or alkaline earth metal halide salt.

14. The dechlorination composition of claim 12, wherein the halide salt comprises up to 20 weight % of the total weight of the dechlorination composition.

15. The dechlorination composition of claim 1, further comprising a stearate salt.

16. The dechlorination composition of claim 15, wherein the stearate salt comprises an inorganic stearate salt.

17. The dechlorination composition of claim 15, wherein the stearate salt comprises up to 10 weight % of the total weight of the dechlorination composition.

18. The dechlorination composition of claim 1, wherein the dechlorination composition is a compressed solid.

19. The dechlorination composition of claim 1, wherein a weight ratio of the saccharide to the borate is within a range of from 1.8:0.2 to 0.2:1.8.

20. A dechlorination composition comprising:
at least one alkali metal sulfite comprising at least 60 weight % of the total weight of the dechlorination composition;
at least one of boric acid, metaboric acid, boric anhydride, or combinations thereof comprising from 0.1 to 30 weight % of the total weight of the dechlorination composition;
at least one hydrogenated vegetable oil comprising from 0.1 to 30 weight % of the total weight of the dechlorination composition; and
at least one saccharide comprising from 0.1 to 30 weight % of the total weight of the dechlorination composition,
wherein the dechlorination composition is a compressed solid.

21. The dechlorination composition of claim 20, further comprising a colorant comprising up to 1 weight % of the total weight of the dechlorination composition.

22. A method of preparing a dechlorination compressed solid comprising:
a) mixing at least one alkali metal sulfite, at least one of boric acid, metaboric acid, boric anhydride, or combinations thereof, at least one hydrogenated vegetable oil, and at least one saccharide to form a dry blended composition;
b) forming a compressed solid from the dry blended composition; and
c) exposing the compressed solid to ambient conditions or a temperature above ambient conditions for a set period of time.

23. The method of claim 22, further comprising milling the alkali metal sulfite to an average particle size of 50 microns to 350 microns prior to step a).

* * * * *